(12) United States Patent
Stark (10) Patent No.: US 8,374,506 B2
(45) Date of Patent: Feb. 12, 2013

(54) APPARATUS FOR TRANSMITTING DATA BETWEEN TWO SYSTEMS WHICH MOVE RELATIVE TO ONE ANOTHER

(75) Inventor: Markus Stark, Waizendorf (DE)

(73) Assignee: Siemens Aktiengesellschaft, München (DE)

( * ) Notice: Subject to any disclaimer, the term of this patent is extended or adjusted under 35 U.S.C. 154(b) by 372 days.

(21) Appl. No.: 12/675,992

(22) PCT Filed: Aug. 1, 2008

(86) PCT No.: PCT/EP2008/060162
§ 371 (c)(1),
(2), (4) Date: Mar. 2, 2010

(87) PCT Pub. No.: WO2009/030561
PCT Pub. Date: Mar. 12, 2009

(65) Prior Publication Data
US 2010/0202782 A1  Aug. 12, 2010

(30) Foreign Application Priority Data

Sep. 4, 2007 (DE) .......................... 10 2007 041 927

(51) Int. Cl.
*H04B 10/22* (2006.01)
*H04B 10/12* (2006.01)
(52) U.S. Cl. ....................................... 398/114; 398/141
(58) Field of Classification Search ................... 398/114, 398/140–144
See application file for complete search history.

(56) References Cited

U.S. PATENT DOCUMENTS

| | | | |
|---|---|---|---|
| 4,749,248 A * | 6/1988 | Aberson et al. ................ | 385/37 |
| 5,121,419 A | 6/1992 | Micheron et al. | |
| 5,535,033 A * | 7/1996 | Guempelein et al. ......... | 398/114 |
| 5,784,507 A | 7/1998 | Holm-Kennedy et al. | |
| 6,826,335 B1 | 11/2004 | Grudinin et al. | |
| 2005/0008294 A1* | 1/2005 | Park et al. ...................... | 385/37 |
| 2007/0274727 A1* | 11/2007 | Haruyama et al. ............ | 398/139 |

FOREIGN PATENT DOCUMENTS

| | | |
|---|---|---|
| CN | 1943147 A | 4/2007 |
| DE | 27 00 407 A1 | 7/1977 |
| DE | 28 46 526 A1 | 5/1980 |
| DE | 32 05 065 A1 | 8/1983 |
| DE | 38 12 203 A1 | 10/1989 |
| DE | 103 02 435 B3 | 7/2004 |
| EP | 0 843 833 B1 | 9/2001 |
| EP | 1 724 952 A1 | 11/2006 |
| EP | 1 959 586 A1 | 8/2008 |
| JP | 2063331 | 3/1990 |

(Continued)

OTHER PUBLICATIONS

International Preliminary Report on Patentability for PCT/EP2008/060162 dated Apr. 2010 with English translation.

(Continued)

*Primary Examiner* — Leslie Pascal
(74) *Attorney, Agent, or Firm* — Lempia Summerfield Katz LLC (57) ABSTRACT

An apparatus for transmitting data at high data rates, between two systems that move relative to one another is provided. The apparatus includes an optical fiber and an axial module on one of the two systems for the purpose of axial data coupling, using the optical fiber and a lateral module on another of the two systems for the purpose of lateral data coupling using the optical fiber.

24 Claims, 5 Drawing Sheets

FOREIGN PATENT DOCUMENTS

| | | |
|---|---|---|
| JP | 2001-308798 | 11/2001 |
| JP | 2004-282685 | 10/2004 |
| WO | WO 99/04309 A1 | 1/1999 |

OTHER PUBLICATIONS

Written Opinion of the International Searching Authority for PCT/EP2008/060162 dated Apr. 2010 with English translation.

International Search Report for PCT/EP2008/060162 dated Jan. 2009.

German Office Action for corresponding German Patent Application No. DE 10 2007 041 927.0-35 dated Jun. 17, 2008 with English translation.

Chinese Office Action dated Jul. 3, 2012 for corresponding Chinese Patent Application No. 200880105609.8 with English translation.

* cited by examiner

APPARATUS FOR TRANSMITTING DATA BETWEEN TWO SYSTEMS WHICH MOVE RELATIVE TO ONE ANOTHER

The present patent document is a §371 nationalization of PCT Application Serial Number PCT/EP2008/060162, filed on Aug. 1, 2008, designating the United States, which is hereby incorporated by reference. This patent document also claims the benefit of DE 10 2007 041 927.0, filed Sep. 4, 2007, which is also hereby incorporated by reference.

BACKGROUND

The present embodiments relate to an apparatus for transmitting data between two systems that move relative to one another.

In a multiplicity of applications, large volumes of data are transmitted between two systems, which move relative to one another. The two systems can be systems rotating relative to one another (e.g., rotary machines of power stations, large motors, radar installations or computed tomography systems) or systems moving translationally relative to one another (e.g., traveling trolleys, rail systems and assembly robots, or a combination of such systems).

Wireless transmission methods using, for example, optical or capacitive transmission may be used for the data transmission. If an area in proximity to an axis of rotation of a rotating system is not available for a data transmission because the area, as in the case of the computed tomography system, must remain excepted, the data transmission takes place in the radially outer region of the rotor, which imposes high demands in terms of the communication connection between a transmitter and a receiver. In addition, the data rates to be transmitted are increasing all the time, as, for example, image processing systems operate with data streams of up to $10^{11}$ bits/second.

It is known from DE 32 05 065 A1 to configure a receiving element in the form of a ring-shaped reflecting trench (e.g., a mirror trench). Light can be coupled at any angular position into the mirror trench in an approximately tangential direction, the light being guided via multiple reflection to a receiving unit. Implementing the mirror trench is complicated, time-consuming and cost-intensive, however. Furthermore, losses are also caused in such systems due to absorption in the mirror trench.

SUMMARY AND DESCRIPTION

The present embodiments may obviate one or more of the drawbacks or limitations in the related art. For example, in one embodiment, an apparatus for transmitting data between two systems moving relative to one another, through which high data rates (e.g., in excess of $10^9$ bits/second) may be reliably transmitted, may be provided.

In one embodiment, an apparatus including an optical fiber and an axial module for axial data coupling to the optical fiber is provided. The axial module is arranged on a system. The apparatus also includes a lateral module for lateral data coupling to the optical fiber, the lateral module being arranged on another system. High-bit-rate data communication may take place through the optical fiber, with a gap between the two systems moving relative to one another being overcome using a data-carrying light beam between the lateral module and the optical fiber.

The term "light" in the following description may be defined by electromagnetic radiation in the spectral range of infrared light to UV light. The modules may include a transmitter or a receiver or both and be provided for coupling in or coupling out signals from the optical fiber or for both. In the case of lateral data coupling, the data-carrying light beam is coupled into the optical fiber through a circumferential surface (e.g., during a movement of the lateral module along the optical fiber). A coupling may be a coupling-in or a coupling-out. The present embodiments are applicable in all the aforementioned systems.

When a standard step index fiber is used as the optical fiber, the standard step index fiber gives rise to the problem that a light pulse is widened in the course of a movement of the light pulse through the optical fiber due to a mode dispersion occurring. As a result, a transmission rate is reduced by the mode dispersion, and a maximum transmission rate is dependent on the length of the optical fiber. This disadvantage may be counteracted if the optical fiber has a mode dispersion suppressing property, the mode dispersion (e.g., a widening of a light pulse) being reduced by at least 50% by virtue of the mode dispersion suppressing property.

In one embodiment, the mode dispersion suppressing property may be realized with an optical waveguide or the optical fiber including a refractive index gradient in the radial direction (e.g., a gradient index fiber (GI fiber)). The refractive index is greatest in the fiber axis and decreases outward (continuously or in sections). In one embodiment, the refractive index decreases with the square of the radius. Using the refractive index gradient, beams are deflected in the direction of the center of the optical fiber and may be guided in the fiber core without a reflection on a cladding. The light runs faster on the outside, with the result that mean propagation velocities of the light paths in the core are approximately equal and a mode dispersion hardly occurs. This enables a high data transmission rate through the optical fiber to be achieved.

In one embodiment, a gradient index fiber made of plastic (e.g., GI-POF: Gradient Index Plastic Optical Fiber) may be used.

In one embodiment, a semi-gradient index fiber may be used. The semi-gradient index fiber has both a region with an index gradient and a reflective layer, at which a total reflection takes place. As a result of the total reflection, low mode dispersion may be combined with a high numerical aperture.

The total reflection is also realized if the optical fiber is a single mode fiber. A mode dispersion may be prevented, owing to the restriction to a single mode. A high bandwidth may also be achieved if the optical fiber is a polarization-retaining fiber.

In one embodiment, the optical fiber includes a polymer cladding (e.g., a polymer clad silica (PCS) fiber). A high data rate may be achieved with low mode dispersion. In PCS fibers, a core made of quartz glass is surrounded by a thin polymer cladding. A high bandwidth may be achieved if the PCS fiber is provided with a partial gradient index profile.

In one embodiment, a proportion of the optical fiber includes a fluorinated polymer, such that a use in the near infrared range with a high data rate and a low attenuation rate of the optical fiber may be achieved. The fluorinated polymer may include polyperfluoro-butenylvinylether.

During a movement of the lateral module past the optical fiber, there is a variation in the optical distance between the lateral module and the axial module and thus, in the transit time of a light pulse between the lateral module and the axial module. If another lateral module couples to the optical fiber and takes over the data transmission, the transit time from the axial module to the another lateral module may be different than the transit time from the axial module to the lateral module. This results in a phase jump in the data transmission during the transmission handover, which may lead to errors in the data transmission.

The phase jump in the data transmission may be counteracted by a delaying device for delaying a data transmission between the axial module and the lateral module. The delaying device is configured to set the delay opposite to a light transit time, between the axial module and the lateral module. The delay is kept constant in total with a light transit time between the axial module and the lateral module by adjustment of a variable delay, irrespective of a position of the lateral module relative to the optical fiber or to the axial module, with the result that a switchover may take place at any time free of phase jump.

In one embodiment, another axial module is disposed at an opposite end of the optical fiber to the axial module. A delaying device is provided, which is configured for delaying a data transmission in accordance with a difference between the light transit time from the lateral module to the axial module and the light transit time from the lateral module to the another axial module. A switchover between the axial module and the another axial module may take place at any time free of phase jump.

A position-dependent delay of the data transmission may be realized with the aid of a positioning system for determining a position of the lateral module relative to an axial module and with the aid of a control unit for setting or controlling the size of the delay on the basis of the position. The position may be relative to the axial module or, if a plurality of axial modules are present, to one of the plurality of axial modules (e.g., an axial module currently transmitting data) or to another fixed point on the system.

A coupling through a high light intensity and a simple data transmission may be achieved using two oppositely aligned optical fibers, which are provided for axial data coupling. The two oppositely aligned optical fibers may also be combined to form one optical fiber, with the axial module being coupled into the optical fiber in such a way that coupled-in radiation into both parts of the combined optical fiber is effected in opposite directions. The two oppositely aligned optical fibers or the combined optical fiber with radiation running in opposite directions may be coupled to a single axial module. In one embodiment, two axial modules, to which one of the two oppositely aligned optical fibers is coupled in each case, may be provided. If more than two optical fibers are present, additional axial modules may be used.

In one embodiment, a phase-jump-free handover of the data transmission between the lateral module and another lateral module with small variations in the intensity of the data signal may be achieved if the oppositely aligned optical fibers are positioned relative to the lateral modules in such a way that one lateral module is laterally coupled to one of the two oppositely aligned optical fibers during operation (e.g., at all times or with the exception of a small overlap during a handover of the data transmission). This may be achieved if a distance between the two lateral modules is at least approximately as great as the distance between the ends of the two optical fibers, such that the another lateral module may start the coupling when the lateral module terminates the coupling. In one embodiment with annularly arranged optical fibers, one lateral module, which terminates the coupling to an optical fiber and starts the coupling to another optical fiber, may be used In one embodiment, the optical distances between the axial module or the respective axial module and ends of the two oppositely aligned optical fibers are equal in size, with the result that a handover without a phase jump is possible.

A reliable handover of the data transmission may be achieved even with optical fibers of unequal length or correspondingly spaced lateral modules if a distance from the other lateral module to the lateral module is less than the distance between the ends of the two oppositely aligned optical fibers, and if a control unit is provided for controlling a handover of the data transmission from the lateral module to the another lateral module in such a way that the handover is accomplished free of a phase jump. In this case, the activation of the other lateral module happens at a time at which optical paths of the two lateral modules to the axial module or to a central coupling point of the optical fiber are of equal length. The lateral module may be switched to inactive simultaneously. In the consideration of the distance the coupling points of the modules to the optical fiber can be seen instead of the modules.

In one embodiment, the apparatus includes another optical fiber following (e.g., immediately) the optical fiber and including an oppositely aligned another axial module. With this arrangement, the lateral modules moving relative to the optical fiber may be disposed in such a way that only one lateral module couples at any given time. In this case a small time range may be excepted, at which a lateral module is located at the last coupling position on an optical fiber. Here, another lateral module may take up the coupling such that a short coupling overlap is possible, in which a switchover takes place (e.g. electrically, mechanically or optically) between the lateral modules. In one embodiment, the optical paths between the lateral modules and the respective axial module at the switchover time are equal in length or the switchover time is appropriately chosen by a control unit so that a phase jump may be avoided.

In order to couple radiation laterally into or out of the optical fibers, coupling structures may be incorporated in the optical fibers in the form of discontinuities. The discontinuities may be refractive in nature or reflective, diffractive or scattering structures. In one embodiment, the coupling structures may be microstructures because of the small diameter of the optical fiber.

In one embodiment, the coupling structures may also cover the complete circumference of the optical fiber.

In one embodiment, the coupling structures may be configured in such a way that the coupling structures effect a directed coupling in the direction of a coupling axial module. Thus, the coupling structures for a lateral coupling-in are configured such that the coupling structures deflect as much radiation as possible in the direction of the coupling axial module in such a way that the radiation is capable of propagating in the optical fiber. In the case of a lateral coupling, as much radiation as possible is directed from the optical fiber in the direction of the lateral module.

In one embodiment, the optical fiber includes coupling structures arranged such that coupled-out radiation is aligned onto the lateral module through interference. A directional characteristic of this kind may be amplified using coupling structures in the manner of a blazed grating (e.g., a blazed grating with an order of diffraction).

In one embodiment, the coupling structures are configured in the form of notches with oblique surfaces, and an effective alignment of the radiation is possible using the angle of the oblique surfaces of the notches of the coupling structures, onto the lateral module. In one embodiment, serrated notches are used, as the serrated notches are easy to manufacture. Notches with oblique approximately parallel surfaces may deflect non-coupled-out radiation to a lesser degree, and is the non-coupled-out radiation may be available more effectively (e.g., for a subsequent coupling-out).

In one embodiment, the coupling structures are cone- or pyramid-shaped, and radiation being coupled in from a plane that is spanned by the direction of the radiation being coupled in and the axis of the optical fiber may be deflected out in a targeted manner. During further propagation, the coupled-in radiation has little contact with further coupling structures and consequently is subject to little disruption in the further propagation.

In one embodiment, the coupling structures are incorporated into an outer cladding of the optical fiber and may be arranged at an entry surface of the lateral coupling. In one embodiment, the optical fiber includes coupling structures, which are arranged in the radial direction of the optical fiber relative to the lateral module to achieve an effective coupling.

As radiation is propagated in the optical fiber, the radiation is subject to an attenuation that is caused primarily by the coupling structures. The greater the distance traveled by the radiation in the optical fiber, the more strongly the radiation is attenuated. A uniform intensity of coupled radiation may be achieved if the optical fiber has coupling structures with a coupling density that increases with increasing distance from the axial module. A stronger lateral coupling takes place at coupling points that are further away from the axial module than at coupling points that are closer, with the result that a loss in intensity due to attenuation may be counteracted (e.g., compensated). The coupling density may be a spatial density of the coupling structures or be characterized by a more strongly coupling design or size of the coupling structures.

The optical fiber may include coupling structures for coupling in/coupling out beams obliquely with respect to the radial direction, and the coupling structures may be kept flat so that the coupling structures cause less disturbance to radiation in the optical fiber. The mean alignment of the radiation to be coupled in or coupled out may be at an angle to the radial direction of the optical fiber.

In one embodiment, in order to counteract a widening of a light pulse caused by a phase shift during a coupling, the lateral module is configured for simultaneously coupling beams out of a plurality of coupling structures. In one embodiment, the apparatus includes a device for correcting the transit time of beams coupled out simultaneously at different points.

The device for correcting the transit time of beams coupled out simultaneously at different points may be implemented when the lateral module is arranged with a transmitting surface or receiving surface at an angle to the optical fiber.

The optical fiber may be sensitive with regard to environmental influences, such as dirt or ambient radiation (e.g., ionizing radiation). In one embodiment, the optical fiber may be screened against a gap to the other system using a radiation-permeable element for protection. A partial cladding to protect against ionizing radiation is also advantageous.

In one embodiment, the screening element may be configured for dual use, refracting (e.g., focusing) coupling radiation. Focusing may be directed onto the optical fiber or the lateral module.

In order to compensate for variations in the intensity of data-carrying coupled light, the screening element may be configured as an attenuating element for attenuating coupling radiation, the attenuation decreasing with increasing distance from the axial module.

DETAILED DESCRIPTION

Figure 1:
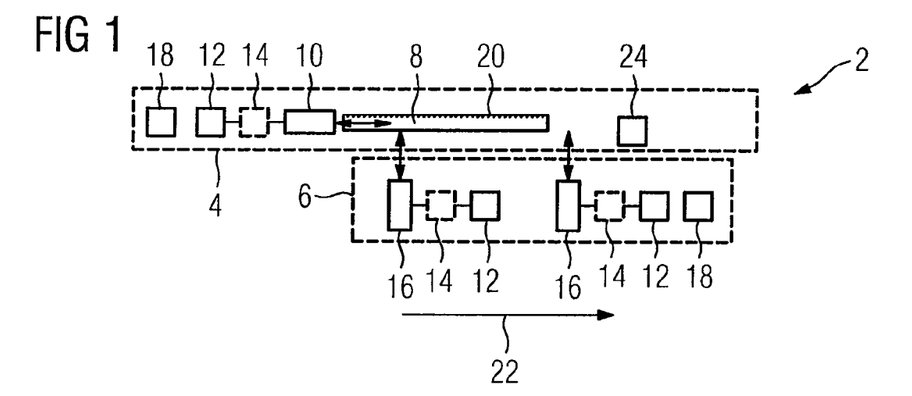
FIG. 1 shows one embodiment of an apparatus for transmitting data

FIG. 1 shows a schematic representation of one embodiment of an apparatus 2 on a first system 4 (e.g., a stationary system such as an earthbound system having a rail) and a second system 6 (e.g., a moving system such as a rail vehicle that is movable on a rail), moving relative to one another. The stationary system 4 includes an optical fiber 8. In one embodiment, the optical fiber 8 may be a single mode fiber with a diameter of 10μ which guides light in one mode on account of a structural implementation (e.g., a small diameter). As a result, the fiber exhibits little mode dispersion and is suitable for transmitting data at a data rate of $10^9$ bits/s. In addition, the optical fiber 8 is a polarization-retaining fiber, in which a polarization direction is maintained and, to that extent, a signal is not widened as a result of a widening of both polarization directions due to birefringence.

Arranged at one end of the optical fiber 8 is an axial module 10, which is provided for the purpose of coupling in or coupling out one or more data-carrying light beams in the axial direction (e.g., through end faces, into the optical fiber 8). Connected to the axial module 10 is a data device 12, which may be a data source for generating data or a data sink for receiving data. Disposed between the data device 12 and the axial module 10 is a delaying device 14, which is provided for temporally delaying data passing through the delaying device.

In one embodiment, the axial module 10 may be coupled to the optical fiber 8 directly by a transmitter or receiver on or in the axial module 10, into the optical fiber 8. Depending on the application location, in one embodiment, the axial module 10 may include an optical waveguide between the transmitter or receiver and the optical fiber 8. In one embodiment, a coupling via at least one lens for adapting beam properties of the transmitter or receiver to the optical fiber 8 may be provided.

The at least one lens may be fixed directly to the optical fiber 8 (e.g., surface-fused to the optical fiber 8).

In one embodiment, a second end of the optical fiber 8, at which no axial module 10 is coupled, may be an optical sump, which is implemented using a coating of a radiation absorber (e.g., a matt black color). No reflections and undesirable signal overlays will be produced at the axial module 10.

In one embodiment, instead of the axial coupling of the axial module 10, the axial module 10 and the optical fiber 8 may be configured to couple data-carrying light beams laterally (e.g., through the radial outer surface of the optical fiber 8, into and out of the optical fiber 8)

The moving system 6 includes two units, each having a lateral module 16 (e.g., a left lateral module and a right lateral module) for laterally coupling one or more data-carrying light beams into or out of the optical fiber 8. A data device is connected to each of the lateral modules (e.g., a left data device and a right data device) via a delaying device (e.g., a left delaying device and a right delaying device). Both the moving system 6 and the stationary system 4 carry a control unit 18 for controlling both the data device 12 and the delaying device 14 in each case.

In one embodiment, the axial module 10 may be disposed with the optical fiber 8 on the moving system 6, and the lateral modules 16 may be disposed on the stationary system 4.

The lateral modules 16 may contain a transmitter and/or receiver or may be connected to the transmitter and/or receiver. A light emitting diode (LED) is suitable as a transmitter. A laser diode or a vertical cavity surface emitting laser (VCSEL), which is a semiconductor laser in which the light is emitted perpendicularly to the plane of the semiconductor chip, in contrast to the conventional edge emitter in which the light exits at one or two edges of the chip, may also be used as the transmitter. For transmission at high data rates, external modulators may also be integrated. Semiconductors with or without additional optical element may be used as receivers.

Figure 8:
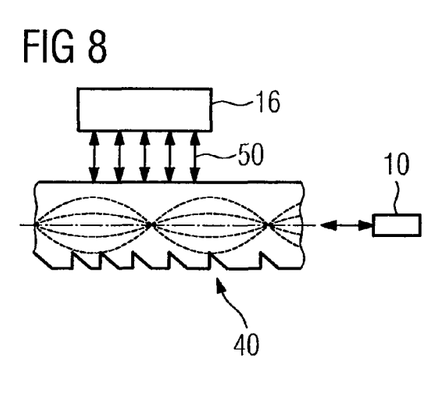
FIG. 8 shows one embodiment of an optical fiber having coupling structures with a gradient in the coupling density.

On an opposite side to the lateral modules 16, the optical fiber 8 is provided with coupling structures 20 in an outer surface of the optical fiber 8, as shown more clearly in FIG. 8. Due to the coupling structures 20, the light running through the optical fiber 8 is in each case coupled out slightly from the optical fiber 8 by being deflected to another side of the optical fiber 8 and striking a reflection surface so steeply that the light may pass through the reflection surface largely without being reflected and reach the lateral module 16.

Conversely, light injected into the optical fiber 8 by the lateral module 16 is deflected by the coupling structures 20 in such a way that the light injected into the optical fiber 8 runs axially through the optical fiber 8 in the direction of the axial module 10.

The coupling structures 20 may act refractively, reflectively, diffractively or by scattering. The coupling structures 20 are uniform in the longitudinal direction of the optical fiber 8 and arranged along a circumference of the optical fiber 8 in such a way that light exiting from the optical fiber 8 is concentrated at the circumference of the optical fiber 8 diffractively (e.g., by refraction in the direction of the lateral module 16, which is arranged in the direction of the primary reflection). In order to effectively suppress the higher-order secondary reflections, the coupling structures 20 are arranged in the manner of a blazed grating.

During operation of the apparatus 2, the moving system 6 moves translationally or rotationally along the stationary system 4, as indicated by an arrow 22. A right lateral module 16, together with the axial module 10, handles the data transmission from the right data device 12. Data generation or data reception is, in each case, controlled by an associated control unit 18 (e.g., the control unit 18 of the stationary system or the control unit 18 of the moving system). In one embodiment, the position of the moving system 6 relative to the stationary system 4 is determined by a positioning system 24 and monitored by the control unit 18 of the stationary system.

The positioning system 24 may detect when the moving system 6 reaches a predetermined position, at which the right lateral module 16 reaches the second end of the optical fiber 8. When the right lateral module 16 reaches the second end of the optical fiber 8, the control unit 18 of the moving system 6 controls the handover of the data transmission from the still active right lateral module 16 to the left lateral module 16. The control unit 18 switches the still active right lateral module 16 to inactive and activates the left lateral module 16, with the result that the data transmission now takes place between the left data device 12 and the data device 12 of the axial module 10. In one embodiment, the handover of the data transmission may also take place mechanically (e.g., using a suitable spacing between the left lateral module 16 and the right lateral module 16 or using the length of an optical waveguide or the optical or fiber 8).

At the start of the data transmission, via the left lateral module 16, the left delaying device 14 is also activated and delays the data stream by a length of time that corresponds to an optical path in the optical fiber 8 between coupling points of the lateral modules 16. Therefore, the shorter optical distance of the now active left lateral module 16 to the axial module is compensated for by the delay in such a way that the handover of the data transmission from the right lateral module 16 to the left lateral module is effected free of phase jump. In the course of the movement of the left lateral module 16 to the right, the optical path between the left lateral module 16 and the axial module 10 increases. The delay by the left delaying device 12 is reduced to the same extent, with the result that the signal transit time for the left data device 12 and the right data device 12 may remain constant.

When the left lateral module 16 reaches the second end of the optical fiber 8, the data transmission is transferred, as described above, to a next-following lateral module 16.

Figure 2:
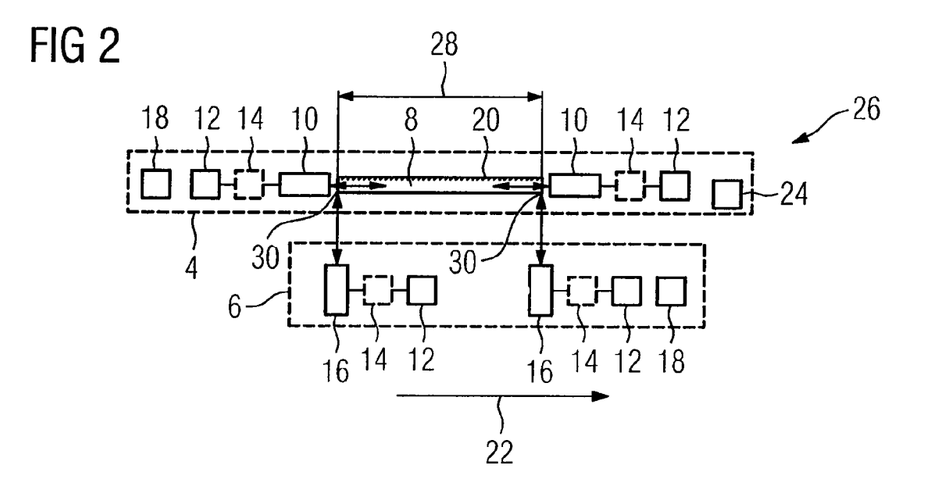
FIG. 2 shows one embodiment of an apparatus having an optical fiber coupled into by two axial modules.

FIG. 2 shows one embodiment of an apparatus 26 for transmitting data between two systems 4, 6 moving relative to one another. The following description is essentially confined to the differences compared to the embodiment shown in FIG. 1, to which reference is made with respect to features and functions that remain the same. Components essentially remaining the same are numbered using the same reference signs.

The apparatus 26 includes an optical fiber 8, which is implemented as a gradient index fiber.

An axial module 10 is disposed at each of the two ends (e.g., a left end and a right end) of the optical fiber 8 such that light may be coupled into and out of the optical fiber 8 on both sides. A distance 28 between coupling points 30, at which lateral modules 16 (e.g., a left lateral module and a right lateral module) couple to the optical fiber 8, is dimensioned such that the distance 28 between the coupling points 30 is approximately equal in size to the length of the optical fiber 8. The left lateral module 16 and the right lateral module 16 may couple simultaneously in a small overlap zone in such a way that the coupling of one lateral module 16 through one end of the optical fiber 8 decreases, as the coupling of another lateral module 16 through another end of the optical fiber 8 increases, with simultaneously equally active lateral modules 16.

In one embodiment, the delaying devices 14 may be dispensed with, since the optical distance from the two lateral modules 16 to the closer of the axial modules 10, in each case, at the time of the handover (e.g., in the middle of a small handover period) is equal. In order to keep the signal transit time between the data devices 12 constant, the delaying devices 14 may, however, be retained. In one embodiment, the distance 28 is considerably smaller than the length of the optical fiber 8, and a switchover does not take place at an equal optical distance.

For the reception of data, the axial module 10, which is closest to the active lateral module 16, is taken into account in order to avoid an overlaying of two data streams. In order to control a switchover between the axial modules 10, the two data streams may, however, be evaluated by the control unit 18, and the switchover may be effected when the two data streams are in phase. In one embodiment, the position may be determined using the positioning system 24, in which case a switchover takes place at a predetermined relative position of the systems 4, 6, where the optical distance from the active lateral module 16 to the two axial modules is equal. In one embodiment, the two axial modules 10 may both be taken into account, with the delay times controlling the signal phases in such a way that the signals are in phase at the lateral coupling point and to that extent, constructively overlay one another.

Figure 3:
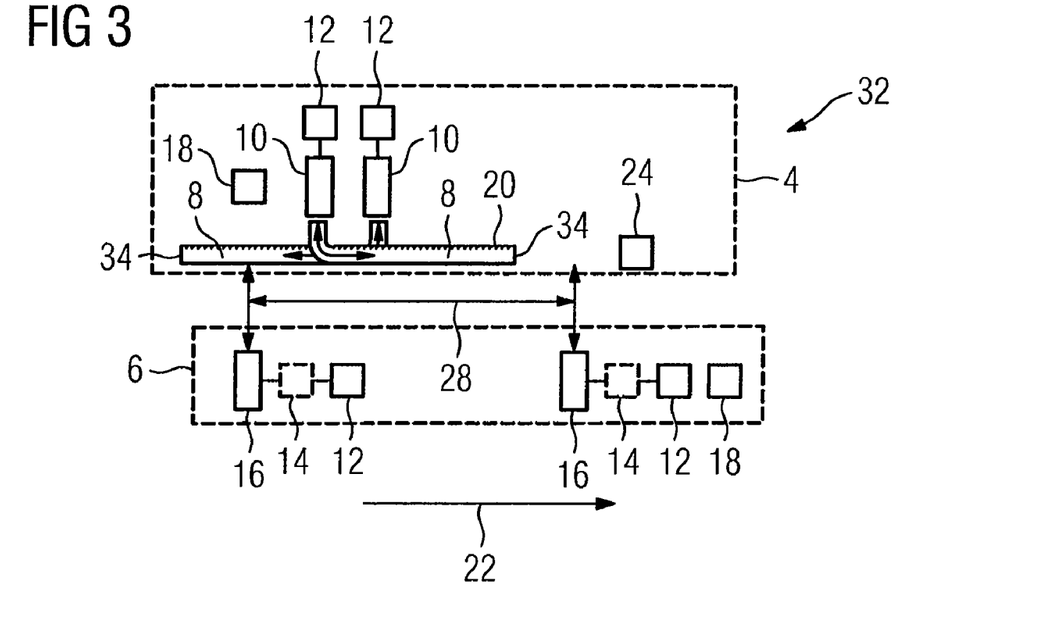
FIG. 3 shows one embodiment of an apparatus having two oppositely aligned optical fibers.

As shown schematically in FIG. 3, in one embodiment of an apparatus 32, data is guided through two oppositely aligned optical fibers 8 (e.g., PCS fibers), and at a central end of each of the two oppositely aligned optical fibers 8, an axial module 10 is disposed. In one embodiment, a control of a handover may be dispensed with if the distance 28 is equal to minimally shorter than the distance between opposite ends 34 of the optical fibers 8, such that the couplings are terminated or started through the opposite ends 34. A delay may also be dispensed with if a handover is controlled when the optical paths from the lateral modules 16 to the associated axial module 10, in each case, are equal.

Figure 4:
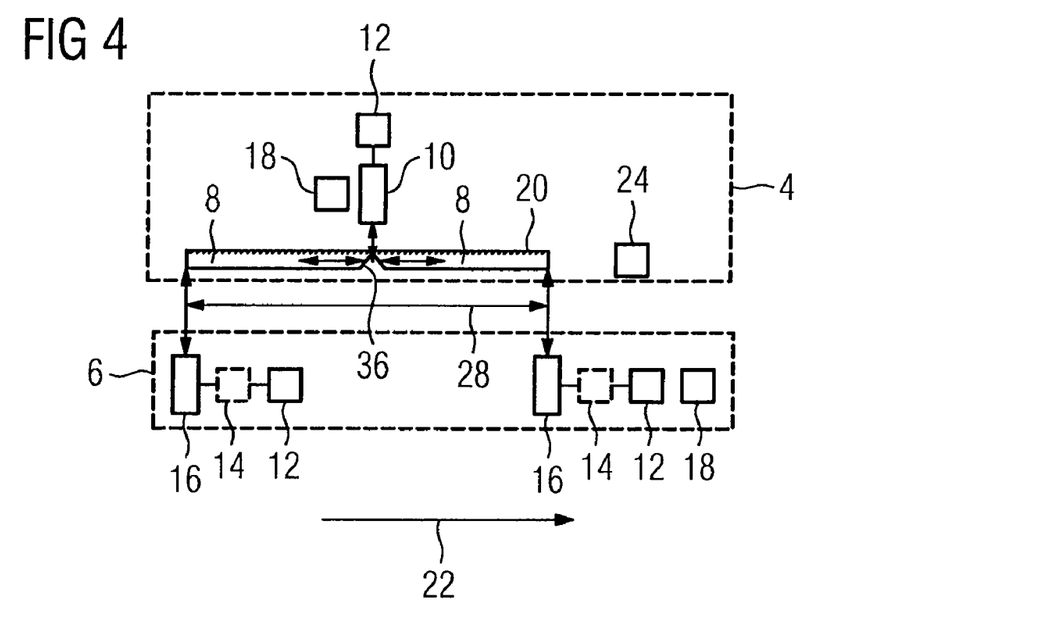
FIG. 4 shows one embodiment of an apparatus having two oppositely aligned optical fibers.

A modification of the embodiment shown in FIG. 3 is shown in FIG. 4. Light is coupled laterally into or out of an end-to-end optical fiber 8 using an axial module 10. The light is propagated in opposite directions using corresponding coupling structures 36, such that two halves of the optical fiber 8 may be regarded as two oppositely arranged optical fibers 8. As explained with reference to FIGS. 2 and 3, in one embodiment a delay or a control of a switchover or handover may be dispensed with.

Figure 5:
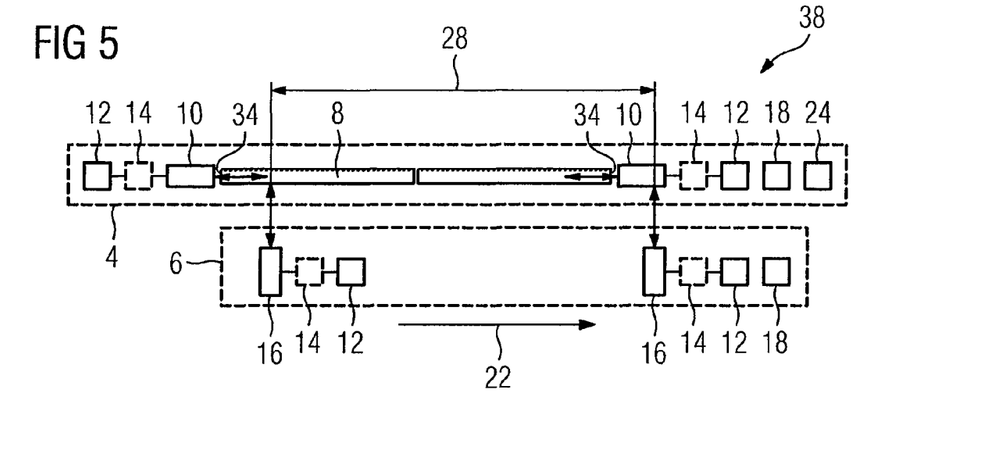
FIG. 5 shows one embodiment of an apparatus having two optical fibers aligned toward one another.

FIG. 5 shows one embodiment of an apparatus 38 that includes two optical fibers 8 facing one another. An axial module 10 is coupled at one end to each of the two optical fibers 8, the axial modules 10 lying opposite one another. The distance 28 between the lateral modules 16 or the coupling points in the optical fiber 8 is as great as or slightly shorter than a distance between ends 34 of the optical fibers 8 facing away from one another. Therefore, one lateral module 16 is coupled to the optical fibers 8 at any given time, with the exception of a slight overlap for the handover. A phase jump does not occur in this arrangement, since the lateral modules are at an equal distance from corresponding axial modules during a handover of the data transmission.

Figure 6:
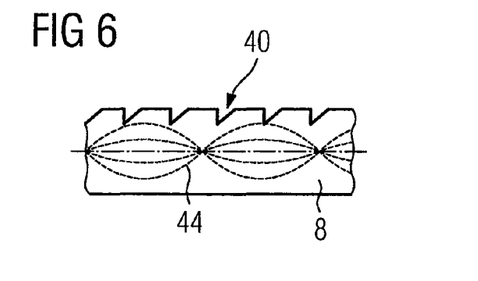
FIG. 6 shows a section through one embodiment of an optical fiber having coupling structures.
Figure 7:
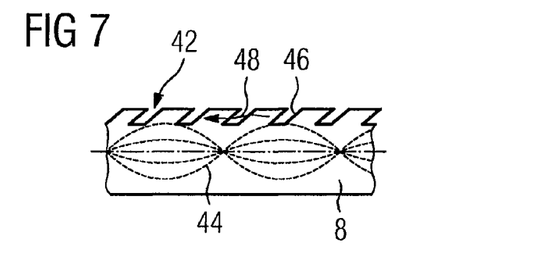
FIG. 7 shows a section through one embodiment of an optical fiber having coupling structures.
Figure 9:
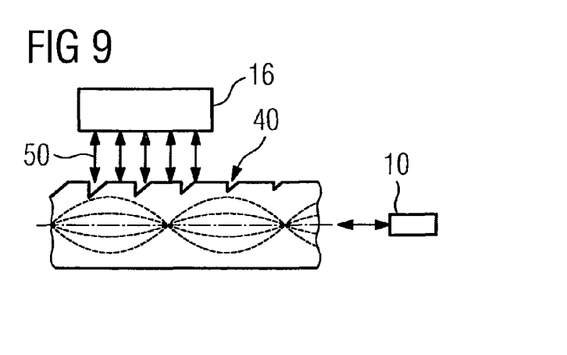
FIG. 9 shows one embodiment of an optical fiber having coupling structures with a gradient in the coupling density.

FIGS. 6 and 7 show two embodiments of coupling structures 40, 42, which may be incorporated as notches with oblique surfaces in an outer surface of a gradient index fiber. The gradient index fiber guides light beams 44 in arcs relative to a fiber axis. With both embodiments of the coupling structures 40, 42, the coupling may take place either directly out of the coupling structures 40, 42, or initially transversely through the optical fiber 8, as shown in FIG. 9. The coupling structures 42 include two approximately parallel oblique surfaces 46, at which light beams 48 not coupled out essentially maintain direction and scatter less than in the case of the coupling structures 40.

The coupling structures 40, 42 may be incorporated using radiation methods (e.g., electron or ion radiation) or using laser radiation (e.g., from an excimer laser, an ultrashort pulse laser, a frequency-converted laser or a $CO_2$ laser). In addition, the coupling structures 40, 42 may be smoothed using a laser or tempering. In one embodiment, the coupling structures may be manufactured by chemical methods, such as reactive ion beam etching, machining methods or stamping (e.g., hot stamping).

FIG. 8 shows one embodiment of opposite coupling, and FIG. 9 shows one embodiment of adjacent coupling, with reference to the position of the coupling structures 40. In both embodiments, a coupling density is graded in such a way that the coupling density increases with increasing distance from the axial module 10. As shown in FIG. 8, the distance between the coupling structures 40 is varied to grade the coupling density and decreases with increasing distance from the axial module 10. In FIG. 9, the size of the coupling structures 40 is varied to grade the coupling density and increases with increasing distance from the axial module 10. In order for the effect of the varied coupling density to be utilized, the lateral module 16 may be configured for simultaneously coupling beams out of a plurality of coupling structures 40 via a coupling point 50, which extends over a plurality of coupling structures 40 (e.g., as represented by the double arrows in FIGS. 8 and 9).

Figure 10:
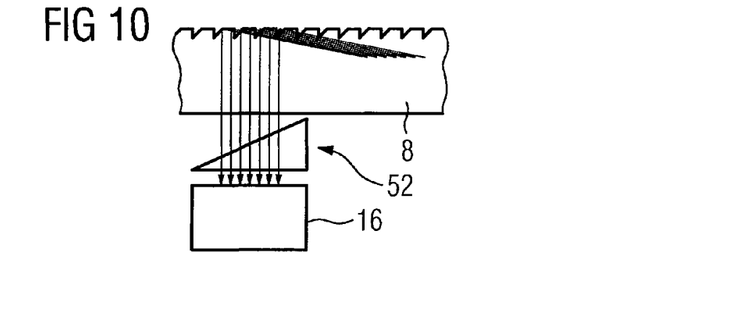
FIG. 10 shows one embodiment of a device for correcting the transit time of beams coupled out simultaneously at different points.
Figure 11:
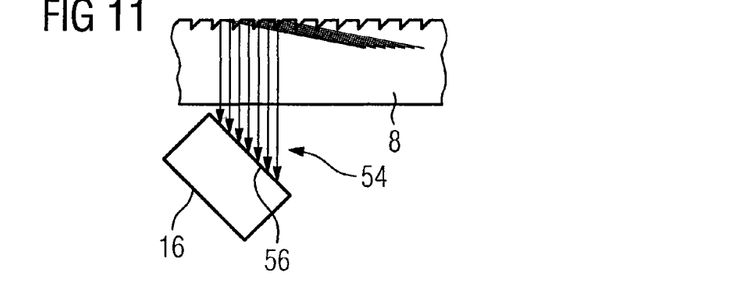
FIG. 11 shows one embodiment of a device for correcting the transit time of beams coupled out simultaneously at different points.

FIGS. 10 and 11 each show one embodiment of a device 52, 54 for correcting a transit time of beams coupled out simultaneously at different points. In both embodiments, the lateral module 16 is configured for simultaneously coupling beams out of a plurality of coupling structures 40. In FIG. 10 the device 52 is located between the lateral module 16 and the optical fiber 8 and includes a light-permeable wedge, which brakes the beams passing through due to a high refractive index. Thus, the beams coupled out earlier (e.g., further to the right), which have a lead in terms of transit time, are braked accordingly and reach the lateral module 16 at the same time as beams coupled out later (e.g., further to the left).

In FIG. 11 the device 54 is realized by an inclination of a coupling surface 56 of the lateral module 16, in which beams exiting the optical fiber 8 at earlier and later times are incident simultaneously.

Figure 12:
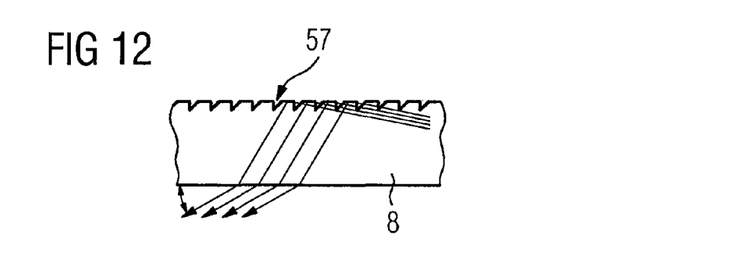
FIG. 12 shows one embodiment of coupling structures for coupling out radiation obliquely from an optical fiber.

FIG. 12 shows coupling structures 57, which are configured for coupling beams out obliquely relative to the radial direction of the optical fiber 8. In a coupling-out of a plurality of modes in a slightly different direction, the mean alignment of the coupled-out radiation is oblique with respect to the radial direction. As a result, the coupling structures 57 may be kept flat.

Figure 13:
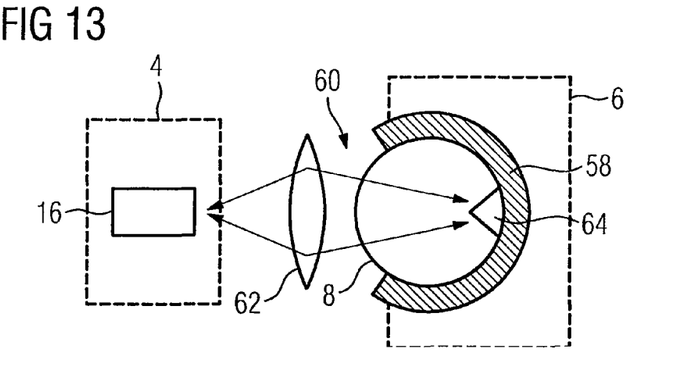
FIG. 13 shows one embodiment of an optical fiber having a focusing screening element.

FIG. 13 shows one embodiment of the optical fiber 8 that is provided with a screen 58 against ionizing radiation in the direction of the moving system 6. The optical fiber 8 is additionally screened against a gap 60 to the stationary system 4 using a radiation-permeable element 62 (e.g., a screen element 62). The screening is implemented only partially and may be penetrable. The screening element 62 is implemented as an elongate lens extending in the axis of the optical fiber 8 and serves to focus coupling radiation onto the optical fiber 8 or the lateral module 16. A high coupling efficiency may be achieved in conjunction with a compensation of tolerances between the stationary system 4 and the moving system 6, moving relative to one another.

A disruption of coupling structures 64 in a light path inside the optical fiber 8 may be kept low using pyramid-shaped coupling structures 64.

Figure 14:
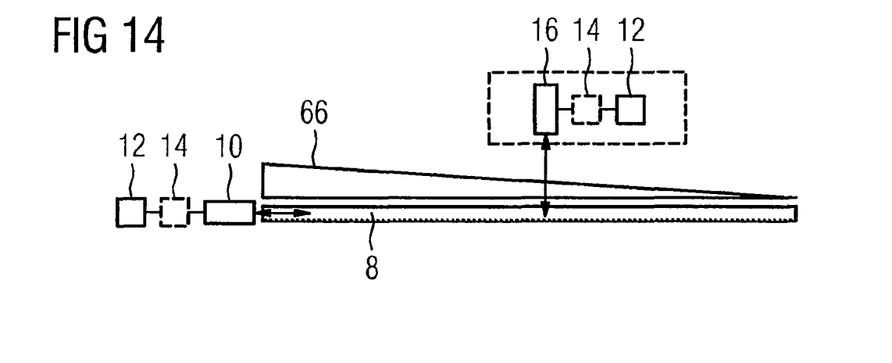
FIG. 14 shows one embodiment of an attenuating screening element along an optical fiber.

One embodiment of a screening element 66 extending in the axis of the optical fiber 8 is shown in FIG. 14. The screening element 66 is implemented as an attenuating element for attenuating coupling radiation, the attenuation decreasing with increasing distance from the axial module 10 in order to keep a coupling signal as constant as possible in intensity over the length of the optical fiber 8. In one embodiment, an electronic attenuating element may be realized via the regulation of power, the electronic attenuating element being controlled by way of a position detection.

Figure 15:
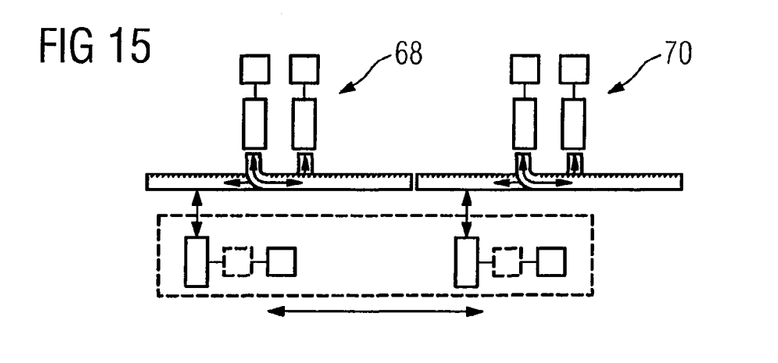
FIG. 15 shows a plurality of modules for transmitting data simultaneously on a plurality of channels.

In one embodiment shown in FIG. 15, separate coupling systems 68, 70, each including one or two optical fibers 8, may be used in order to utilize a plurality of data channels. Both of the separate coupling systems 68, 70 are active simultaneously and transmit different data channels. The separate coupling systems 68, 70 may be implemented as explained with reference to the preceding figures.

In one embodiment, the data transmission may be performed such that the separate coupling systems 68, 70 transmit data in different directions. In one embodiment, both of the separate coupling systems 68, 70 transmit data in both directions, one axial module 10 therefore serving simultaneously or sequentially as receiver and transmitter.

The data may be assigned to the receivers, where the transmitters are assigned to the plurality of data channels as a function of position, or the other way round.

When the plurality of data channels are transmitted via an optical fiber 8, a wavelength division multiplexing scheme may be used, in which a plurality of transmitters send at different wavelengths, such that, for example, an axial module 10 transmits a plurality of frequencies. Appropriate multiplexers may be used in order to combine or split up the channels.

Figure 16:
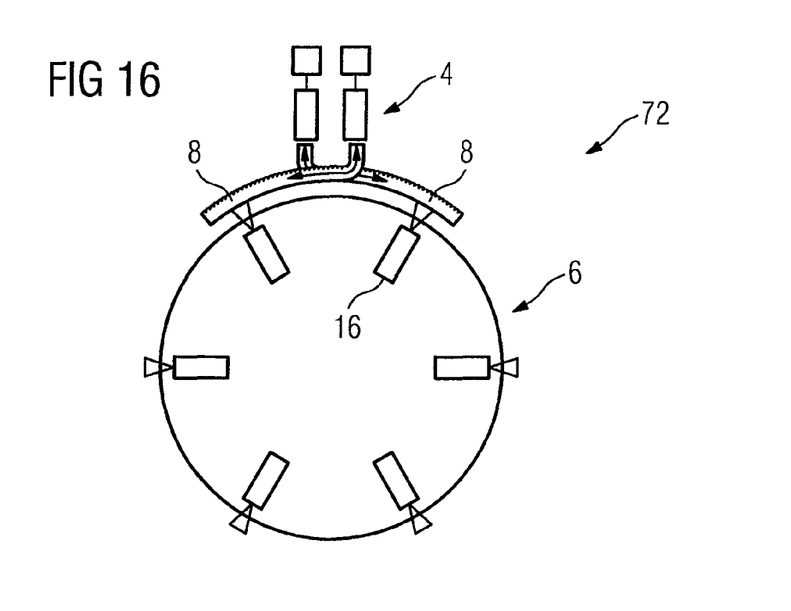
FIG. 16 shows a plurality of modules on a rotating system.

FIG. 16 shows the use of an apparatus 72 as a coupling system in the case of a rotating system 6, for example, in the case of a computed tomography scanner in which an optical fiber 8 disposed on the stationary system 4 or on the rotating system 6 goes around an entire circumference (e.g., in the manner of the apparatus from FIG. 4). In one embodiment, a plurality of optical fibers 8 cover an angular range and collectively extend around the circumference. At least one lateral module 16 more than number of the plurality of optical fibers 8 may be provided as a radiation conductor 8 so that an overlap may be achieved for the handover, and no interruption in the data transmission occurs. In one embodiment, the lateral modules 16 may have a coupling range that is so wide that gaps between the plurality of optical fibers 8 may be bridged. In one embodiment, the same number of transmitters and receivers are provided with an interruption of the data streams.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An apparatus for transmitting data between two systems that move relative to one another, the apparatus comprising:
an optical fiber;
an axial module on a first system, the axial module operable for axial data coupling to the optical fiber;
a lateral module on a second system, the lateral module operable for lateral data coupling to the optical fiber; and
a delaying device operable to delay a data transmission between the axial module and the lateral module and configured to set the delay opposite to a light transit time between the axial module and the lateral module.

2. The apparatus as claimed in claim 1, wherein the optical fiber has a refractive index gradient in a radial direction.

3. The apparatus as claimed in claim 1, wherein the optical fiber is a single mode fiber.

4. The apparatus as claimed in claim 1, wherein the optical fiber has a polymer cladding.

5. The apparatus as claimed in claim 1, wherein the optical fiber comprises fluorinated polymer.

6. The apparatus as claimed in claim 1, wherein the optical fiber is a polarization-retaining fiber.

7. The apparatus as claimed in claim 1, wherein the apparatus is operable to be used as a coupling system between a rotating subregion and a stationary subregion in a computed tomography scanner.

8. The apparatus as claimed in claim 1, further comprising:
another axial module at an opposite end of the optical fiber to the axial module,
wherein the delaying device is operable for delaying a data transmission in accordance with a difference between a light transit time from the lateral module to the axial module, and a light transit time from the lateral module to the another axial module.

9. The apparatus as claimed in claim 1, further comprising:
a positioning system operable for determining a position of the lateral module relative to the axial module; and
a control unit operable for controlling the size of the delay on the basis of the position.

10. The apparatus as claimed in claim 1, wherein the optical fiber comprises two oppositely aligned optical fibers, and
wherein the two oppositely aligned optical fibers are operable to couple axial data and are connected to the axial module.

11. The apparatus as claimed in claim 10, wherein the two oppositely aligned optical fibers are positioned in relation to the lateral module such that during operation, the lateral module is laterally coupled to an optical fiber of the two oppositely aligned optical fibers at any given time.

12. The apparatus as claimed in claim 10, further comprising:
another lateral module, wherein a distance from the another lateral module to the lateral module is equal to or less than a distance between opposite ends of the two oppositely aligned optical fibers; and
a controller operable to control a handover of a data transmission from the lateral module to the another lateral module such that the handover is effected free of a phase jump.

13. The apparatus as claimed in claim 1, further comprising another optical fiber connecting to the optical fiber and another axial module that is oppositely arranged.

14. The apparatus as claimed in claim 1,
wherein the optical fiber comprises coupling structures, through the arrangement of which coupled-out radiation is aligned onto the lateral module through interference.

15. The apparatus as claimed in claim 1, wherein the optical fiber comprises coupling structures in the form of notches with oblique surfaces.

16. The apparatus as claimed in claim 1, wherein the optical fiber comprises cone- or pyramid-shaped coupling structures.

17. The apparatus as claimed in claim 1, wherein the optical fiber comprises coupling structures with a coupling density that increases with increasing distance from the axial module.

18. The apparatus as claimed in claim 1, wherein the optical fiber comprises coupling structures that are arranged in a radial direction of the optical fiber with respect to the lateral module.

19. The apparatus as claimed in claim 1, wherein the optical fiber comprises coupling structures operable for coupling beams in/out obliquely relative to a radial direction.

20. The apparatus as claimed in claim 1, wherein the optical fiber comprises:

a plurality of coupling structures, the lateral module being configured for simultaneously coupling beams out of the plurality of coupling structures; and a correcting device operable to correct a transit time of beams coupled out simultaneously at different points.

21. The apparatus as claimed in claim 1, wherein the lateral module is arranged with a receiving surface that is oblique relative to the optical fiber.

22. The apparatus as claimed in claim 1, wherein the optical fiber is screened against a gap to the second system by a screening element that is radiation-permeable.

23. The apparatus as claimed in claim 22, wherein the screening element is configured for refracting coupling radiation.

24. The apparatus as claimed in claim 22, wherein the screening element is configured as an attenuating element for attenuating coupling radiation, and the attenuation decreases with increasing distance from the axial module.

* * * * *